(12) United States Patent
Jokinen et al.

(10) Patent No.: US 9,054,998 B2
(45) Date of Patent: Jun. 9, 2015

(54) SYSTEM AND METHOD FOR MAINTAINING PACKET ORDER IN AN ORDERED DATA STREAM

(71) Applicants: Tommi M. Jokinen, Austin, TX (US); David B. Kramer, Cedar Park, TX (US); Kun Xu, Austin, TX (US)

(72) Inventors: Tommi M. Jokinen, Austin, TX (US); David B. Kramer, Cedar Park, TX (US); Kun Xu, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 187 days.

(21) Appl. No.: 13/760,109

(22) Filed: Feb. 6, 2013

(65) Prior Publication Data

US 2014/0219276 A1    Aug. 7, 2014

(51) Int. Cl.
*H04L 12/861*    (2013.01)
*H04L 12/863*    (2013.01)

(52) U.S. Cl.
CPC ...................................... *H04L 47/62* (2013.01)

(58) Field of Classification Search
None
See application file for complete search history.

(56) References Cited

U.S. PATENT DOCUMENTS

| 7,924,860 | B1 | 4/2011 | Frailong et al. |
| 2002/0145976 | A1 | 10/2002 | Meyer et al. |
| 2005/0068896 | A1* | 3/2005 | Pazos ............................ 370/235 |
| 2007/0237151 | A1* | 10/2007 | Alfano ......................... 370/392 |

* cited by examiner

*Primary Examiner* — Chi H Pham
*Assistant Examiner* — Shick Hom

(57) ABSTRACT

A source processor can divide each packet of a data stream into multiple segments prior to communication of the packet, allowing a packet to be transmitted in smaller chunks. The source processor can process the segments for two or more packets for a given data stream concurrently, and provide appropriate context information in each segments header to facilitate in order transmission and reception of the packets represented by the individual segments. Similarly, a destination processor can receive the packet segments packets for an ordered data stream from a source processor, and can assign different contexts, based upon the context information in each segments header. When a last segment is received for a particular packet, the context for the particular packet is closed, and a descriptor for the packet is sent to a queue. The order in which the last segments of the packets are transmitted maintains order amongst the packets.

20 Claims, 4 Drawing Sheets

SYSTEM AND METHOD FOR MAINTAINING PACKET ORDER IN AN ORDERED DATA STREAM

FIELD OF THE DISCLOSURE

This disclosure generally relates to data processing, and more particularly to a system and method maintaining packet order of a data stream.

BACKGROUND

A system can include a switching fabric to communicate information between multiple data processor devices. The data processor devices can use multiple data streams (streams) to communicate with each other via the switching fabric. A stream can be implemented using packetized messages (packets) that the switching fabric can route from a source device to a destination device, wherein a packet has a header that includes header fields, and a payload that includes data. If the data stream is an ordered data stream, the packets of the stream should be placed in a queue of the destination device in the same order as the packets were retrieved from a queue in the source device, even when the source device divides the packets into segments to reduce the size of the messages sent to the destination device.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
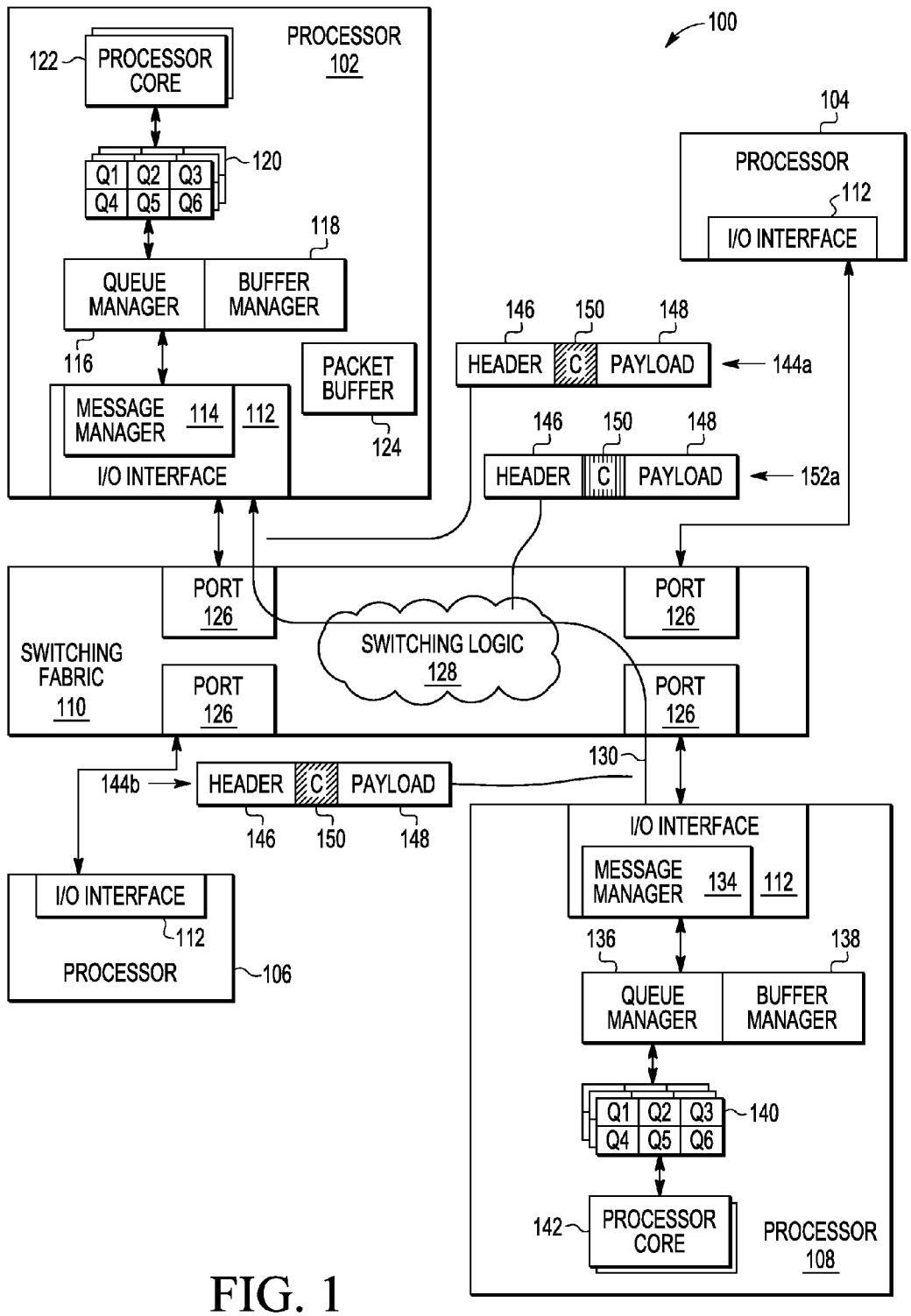
FIG. 1 illustrates a system including multiple processors in accordance with at least one embodiment of the present disclosure.

A messaging system employing multiple processors that can utilize different data streams to communicate information amongst the multiple processors via a switching fabric. In particular, each data stream can include a plurality of packets, and each packet can be segmented into multiple segments. The packets within a specific data stream can have a particular order amongst themselves that needs to be maintained between the source and destination device. For example, a voice data stream can include multiple packets that should be processed in a particular order at the destination device.

A message manager in the source processor can divide each packet of a given data stream into multiple segments prior to transmission of the packet, therein allowing a packet to be transmitted in smaller chunks. The message manager can detect when a given data stream is an ordered data steam, which includes multiple packets of data to be delivered in a specific order at the source device. In response to detecting an ordered stream, the message manager of the source device can continue to retrieve multiple packets from a source queue for concurrent processing and transmission, and still assure that the relative transmission order is maintained by varying one or more bits of a header field in accordance with a particular embodiment described herein. In particular, the source device is capable of concurrently processing multiple packets, and can transmit the multiple packets via a transmission line of the switching fabric. As used herein, data packets that are described as being transmitted or delivered in a particular order are data packets that are queued at the source device in a particular order, and that are to be queued at the destination device in the same order. The system described herein ensures that a packet completely transmitted prior to another packet will be queued at the destination device.

For example, if the message manager retrieves a first packet and a second packet to be transmitted in that order, the message manager can divide each of the packets into multiple segments for transmission and set a particular header field, referred to as a context field, of each segment of the first packet to a first value, presumed to be zero, and each segment of the second packet to a second value, presumed to be one. The second value can be indicative of a segment belonging to a packet that needs to be transmitted after another packet, e.g. the value one indicates that the second packet is to be transmitted after the first packet, which is associated with the value zero. In this manner, the source processor can use separate hardware, such as separate segmentation engines, to process the first and second packets concurrently. According to an embodiment, the message manager of the source processor will monitor the context fields of each packet's segments in order to prevent transmission of the last segment of the second packet until after the last segment of the first packet has been transmitted. Thus, assuring the first packet is fully transmitted prior to the second packet.

The destination processor can receive each packet's segments, and allocate/assign different local contexts for the segments corresponding to the different context field values, and can reassemble the segments into each of the packets and store the reassembled packets in a memory as they are received. For example, a destination processor will open/create a first context upon receiving a first segment of a first packet having a context field value of zero, wherein the first segment and each subsequent segment of the first packet, will be associated with the first context. Similarly, the destination process will open/create a second context upon receiving a first segment of the second packet of the same data stream having a context field value of one, wherein the first segment and each subsequent segment of the second packet, will be associated with the second context. When all of the segments of the first packet have been received, the message manager can close the first context and then place a descriptor for the packet into a particular queue associated with the data stream, prior to placing a packet associated with any subsequently received packet in the queue. That is, a descriptor includes information that indicates the existence of segments having context field values of zero and indicates a memory location where segments having the particular context are stored. Thus, by ensuring at the source processor that the first packet is transmitted prior to the last segment of the second packet, it can be assured that the first packet will be received, processed, and enqueued at the packet's queue prior to the second packet. Thus, all but the last segment of multiple packets of the same data stream can be transmitted concurrently or out of order, e.g., over a serial communication channel or over parallel communication channels, and will be placed into a data stream queue in the proper order by ensuring at the transmitter that desired ordering is reflected by the order in which the last segment of each packet is transmitted.

According to an embodiment, the field of the segment headers that is used as a context field is known a priori to the source and destination device. Alternatively, the field of the segment headers used as the context field is not known a priori and is instead communicated between the source and destination device during initialization, restart, or any type of configuration process. It will be appreciated, that the context field is generally a location of the segment header that is to be modified for the purposes described herein. Thus, the context field may need to be masked with respect to other operations as will be described in greater detail herein. Various embodiments of the present disclosure will be better understood with reference to FIGS. 1-5.

FIG. 1 illustrates a system 100 including processors 102, 104, 106, and 108 (processors 102-108) and switching fabric 110 in accordance with at least one embodiment of the present disclosure. In an embodiment, the system 100 is a system on a chip (SoC), such that each of the processor 102-108 is included within the same SoC. In an embodiment, the switching fabric 110 can be a crossbar switch or the like. Each of the processors 102-108 includes an input/output (I/O) interface 112. The processor 102 is described herein as receiving packets in an ordered data stream and is therefore also referred to as destination processor 102, though it will be appreciated that in various embodiments, processor 102 can also be a source processor that provides packets of an ordered data stream to another processor.

Destination processor 102 includes a message manager 114 within the I/O interface 112, a queue manager 116, a buffer manager 118, multiple groups of queues 120, multiple processor cores 122, and packet buffers 124. Depending on the embodiment, queues in the groups of queues 120 can be physical queues, virtual queues, and the like.

The processor 108 is described herein as transmitting packets in an ordered data stream and is therefore also referred to as source processor 108, though it will be appreciated that in various embodiments, processor 108 can also be a destination processor that receives packets in the ordered data stream from another processor. In the described embodiment, the packets transmitted between processor 108 and processor 102 are divided up and transmitted/received as a plurality of segments. The source processor 108 includes a message manager 134 within the I/O interface 112, a queue manager 136, a buffer manager 138, multiple groups of queues 140, and multiple processor cores 142. Depending on the embodiment, queues in the groups of queues 140 can be physical queues, virtual queues, and the like. Each of the other processors 104 and 106 can also include a message manager, a queue manager, a buffer manager, queues, multiple processor cores, and packet buffer, but these have not been shown in FIG. 1 for simplicity.

The switching fabric 110 includes multiple ports 126 and switching logic 128. Each of the processors 102-108 is connected to a corresponding port 126, and can operate as a destination processor or a source processor for receiving and sending messages, respectively. However, for simplicity it is presumed that processor 102 is operating as a destination processor and processor 108 is operating as a source processor.

A particular data stream 130 is illustrated to communicate packet messages between source processor 108 and destination processor 102 via a particular communication path through the switching fabric 110. In particular, each data stream can be partitioned into a plurality of packets, where each packet includes a portion of the data stream information.

The message manager 134 in the source processor 108 can transmit each packet as a segmented packet, wherein each packet of a given data stream 130 is divided into multiple segments prior to transmission of the packet, therein allowing a packet to be transmitted in smaller chunks.

As illustrated, the segments 144a, 144b, and 152a can include a segment, e.g., a portion, of a packet's payload 148 and a header 146. In one embodiment, both segments 144a and 144b can be portions of the payload of a packet 144 in the ordered data stream 130. Similarly, segment 152a can be a portion of the payload of a packet 152 in the ordered data stream. The header 146 can include multiple fields, such as a destination identification (DID) field that indicates information about the destination processor 102, a source identification (SID) field that indicates information about the source processor 108, a class-of-service (COS) field that indicates a level of service for the data stream, a stream identification field indicates a data stream that the segment belongs to, a flow identification field indicates a location of the segment within the data stream, a physical source port (PORT) field that indicates the port of the source processor 108 that the segment was sent from, a letter field that indicates a whether the segment is part of a letter message, a mailbox field that indicates whether the segment is part of a mailbox message, and the like. Based upon the header information, the switching logic 128 determines that the segments 144a, 144b, and 152a are addressed to the destination processor 102, and routes the segments 144a, 144b, and 152a out of the switching fabric 110 via the port 126 to the destination processor 102.

In an embodiment, the communication path can include: an intra-die communication path, wherein packets are transmitted between processors of a common integrated circuit die; or an inter-die communication path, wherein packets are transmitted between processors on different die. For example, the processor 102 and processor 108 can reside on separate die that are mounted to a common substrate, such as to a printed circuit board, to a package substrate, and the like. According to one embodiment the segmented portions of the packetized messages are compliant with the RapidIO communication protocol. Thus, the system 100 can utilize the RapidIO communication protocol to transfer segments 144, 154, and 156 of packets between different processors of the system 100, such as instruction based data processors. In one embodiment, the packets can be part of a RapidIO Type11 message, a RapidIO Type9 data stream, or the like. In one embodiment, the segments 144a, 144b, and 152a can be transferred between the processors by the switching logic 128, which can be a crosspoint switch implemented in hardware, software, or the like.

When the I/O interface 112 of the destination processor 102 receives the segment 144a, the message manager 114 utilizes a context field 150 of the header 146 of the segment 144a to determine a context for the segment 144a. For example, any segments 144a, 144b, and 152a having the same value in context field 150 is a portion of the same packet. As used herein, a context can be referred to as a hardware reassembly context. A hardware reassembly context can be allocated/assigned/created when a first segment of a packet arrives at the destination processor 102. The hardware reassembly context can hold a common set of packet header attributes to identify additional segments of the same packet flow. The hardware reassembly context can also contain common parameters, such as memory addresses, initialized when the first segment arrives, which can be updated during the reassembly process. The buffer manager 118 further allocates packet buffers 124, e.g., queues, in a memory cache of the destination processor 102 for each segment to be written after each of the segments 144a, 144b, and 152a are reassembled in the message manager 114. For example, the buffer manager 118 can maintain a list of available buffers that the segments 144a and 152a can be written. In one embodiment, only the payload 148 is placed into the packet buffers 124 as each segment and then after all of the segments of a packet are received a single header for the packet is reassembled and written at a location in the packet buffers 124 with the first segment of the packet. In another embodiment, the entire segment including the header 146 and the payload 148 is reassembled and place in the packet buffers 124.

The message manager 114 maintains the segments in a proper order. For example, for a Type 9 packet the message manager 114 creates a record, such as a table, to identify how each of the segments is connected/stitched together. For a Type 11 packet, the message manager 114 stores the segments in a correct order in the memory. After, all of the segments of a particular packet are received and reassembled, the message manager 114 utilizes some or all of the fields in the header 146 to determine a particular queue in the groups of queues 120 at which a descriptor for the packet will be stored. In one embodiment, the message manager 114 can identify bits of the header 146 to be masked (not used) during the selection of a queue of the plurality of queues 120 to place the descriptor for the packet as will be described in greater detail herein.

Figure 2:
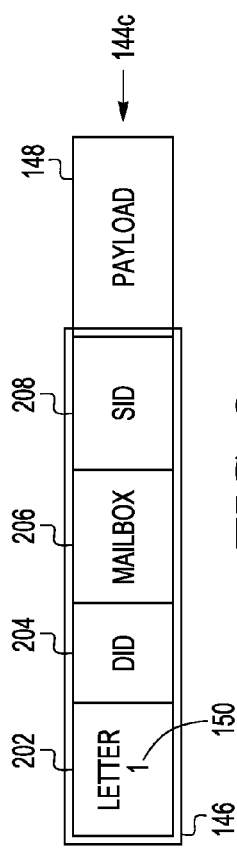
FIG. 2 illustrates a segment of a packet transmitted between two processors of FIG. 1 in accordance with at least one embodiment of the present disclosure.

FIG. 2 illustrates a segment 144a sent between the source processor 108 and the destination processor 102 in accordance with at least one embodiment of the present disclosure. The header 146 of the segment 144a includes letter field 202, a DID field 204, mailbox field 206, and a SID field 208. The locations of the fields 202-208 as used herein are exemplary and the fields 202-208 can be in different locations of the header 146 and different fields can be located within the header 146. The payload 148 of the packet includes a plurality of bits. Any of the fields 202-208, such as the letter field 202, can be utilized as a context field for the segment 144a. Thus, the message manager 134 can vary the value of the letter field 202 between segments to indicate a particular packet for the segment. However, even though all of the fields 202-208 can be used as the context field, not all of the fields 202-208 can have the value within the field can be rotated, such as any field that includes source device or destination device information. Thus, the selection of a field that can be rotated can allow the message manager 134 to distinguish between packets.

When the segment 144a is received at the destination processor 102, the message manager 114 can utilize the context field 150 to identify the segment 144a as belonging to a particular packet in the ordered data stream 130. The operation of varying the bits in the context field 150 in the header 146 of the segment 144a in the source processor 108 and identifying the segments as being a portion of a particular packet at the destination processor 102 to maintain proper order in the data stream 130 is described in more detail with reference to FIG. 3.

Figure 3:
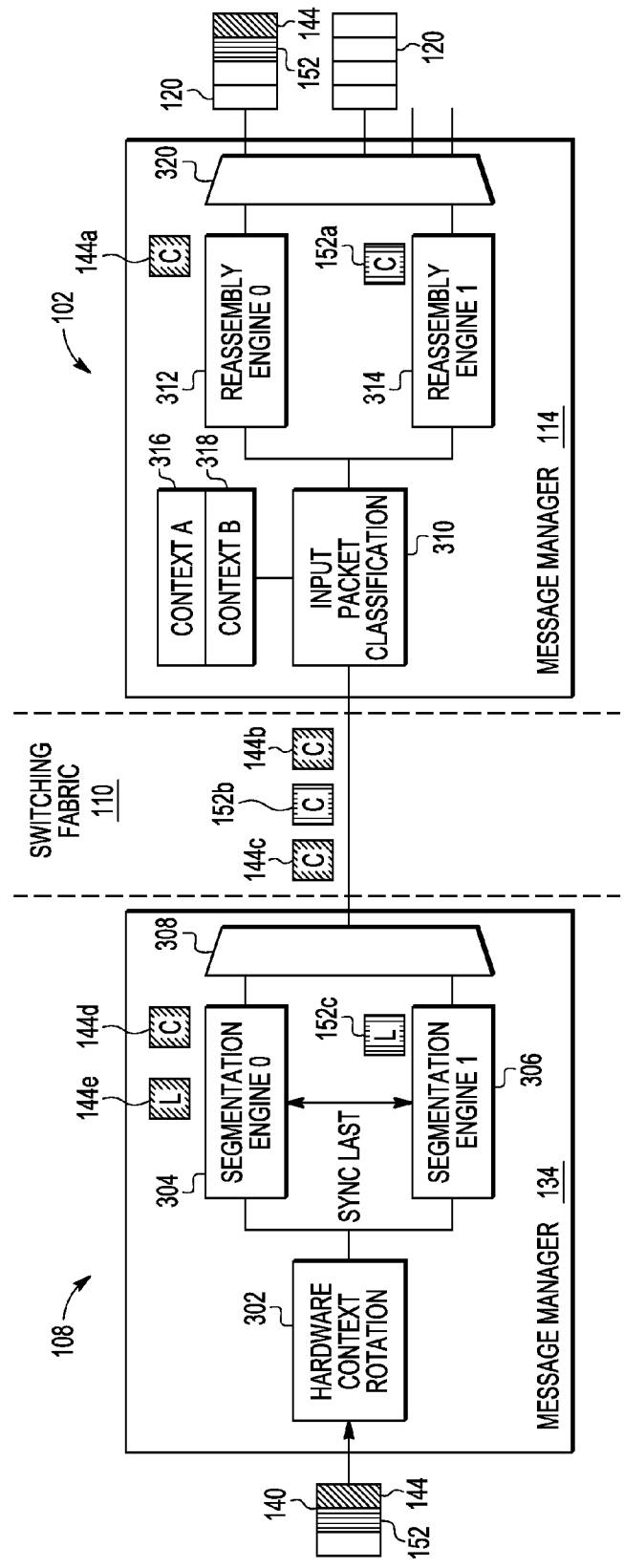
FIG. 3 illustrates message managers of two processor of FIG. 1 in more detail and in accordance with at least one embodiment of the present disclosure.

FIG. 3 illustrates the message manager 134 of the source processor 108 and the message manager 114 of the source processor 102 of FIG. 1 in greater detail and in accordance with an embodiment of the present disclosure. The message manager 134 of source processor 108 includes a hardware context rotation module 302, a first segmentation engine 304, a second segmentation engine 306, and a multiplexer 308. In one embodiment, the message manager 134 can include more or less segmentation engines, but for simplicity only two segmentation engines have been shown. The message manager 114 includes an input packet classification module 310, a first reassembly engine 312, a second reassembly engine 314, a first context 316, a second context 318, and a multiplexer 320. In one embodiment, the message manager 114 can include more or less reassembly engines, but for simplicity only two reassembly engines have been shown.

The message manager 134 can retrieve packets 144 and 152 of a data stream 130 from a particular queue of the group of queues 140, and can make a determination whether the data stream 130 is an ordered data stream, such that the order of the packets 144 and 152 should be maintained in the destination processor 102. For example, if the packets 144 and 152 are part of an ordered data stream 130, the packets should be placed in the same queue of the group of queues 120 in the destination processor 102 in the same order that they are retrieved from the queue 140 of the source processor 108. When the message manager 134 determines that the packets 144 and 152 are part of an ordered data stream 130, the message manager 134 can provide the multiple packets 144 and 152 to the hardware context rotation module 302. The hardware context rotation module 302 can then vary the context field 150 in the header 146 of the packets 144 and 152 to indicate a relative order between the packets 144 and 152. For example, the hardware context rotation module 302 can set the context field 150 for the packet 144 to a first value, and set the context field 150 for the packet 152 to a second value. The hardware context rotation module 302 can then provide packet 144 to the first segmentation engine 304 and provide the packet 152 to the second segmentation engine 306 based on the order of the packets 144 and 152 in the ordered data stream 130.

The first segmentation engine 304 can divide payload of the packet 144 into multiple segments or portions (referred to herein as segments 144a, 144b, 144c, 144d, and 144e), and can append the same header 146 with the value in the context field 150 as the packet 144 to each the segments 144a-144e so that the segments 144 a-144e can be identified as part of the packet 144. For simplicity, each of the segments 144 a-144e are represented as a single block, however one of ordinary skill in the art would recognize that the segments 144 a-144e would include a header 146 and a payload 148 similar to those shown in FIG. 2. The second segmentation engine 306 can divide payload of the packet 152 into multiple segments (referred to herein as segments 152a, 152b, and 152c), and can append the same header with the same value in the context field 150 as the packet 152 to each of the segments 152a-152c so that the segments 152 a-152c can be identified as part of the packet 152. For simplicity, each of the segments 152 a-152c are represented as a single block, however one of ordinary skill in the art would recognize that the segments 152 a-152c would include a header 146 and a payload 148 similar to those shown for segment 144a in FIG. 2. In an embodiment, the segmentation engines 304 and 306 can concurrently divide the packets 144 and 152 into respective segments 144a-144e and 152a-152c, which can allow the packets 144 and 152 to be transmitted to the destination processor 102 in smaller chunks.

If the message manager 114 determines that the order of the packets should be maintained in the destination processor 102, the message manager 114 can cause the segmentation engines 304 and 306 to synchronize the transmission of the last segment of the packets 144 and 152. For example, if packet order is to be maintained and the packet 144 is located prior to the packet 152 in an ordered data stream 130, the message manager 114 can synchronize the segmentation engines 304 and 306 to make the segmentation engine 304 transmit the last segment 144e of packet 144 before the segmentation engine 306 transmits the last segment 152c of the packet 152. In one embodiment, if the segmentation engine 306 is ready to transmit the last segment 152c of the packet 152, the segmentation engine 306 can poll the segmentation engine 304 to determine whether the last segment 144e of packet 144 has been transmitted. The segmentation engine 306 can then stall the transmission of the last segment 152c of the packet 152 until a polling result from segmentation engine 304 indicates that the last segment 144e of the packet 144 has been transmitted. In one embodiment, the segmentation engine 304 can actively indicate to the segmentation engine 306 when the last segment 144e of the packet 144 is transmitted instead of the segmentation engine 306 polling the segmentation engine 304. For example, the segmentation engine 304 can continually provide the segmentation engine 306 with a signal until the last segment 144e of the packet 144 is transmitted. Thus, the segmentation engine 306 stalls the transmission of the last segment 152c of the packet 152 until the segmentation engine 304 stops providing the signal to the segmentation engine 306.

The first and second segmentation engines 304 and 306 can respectively provide the segments 144a-144e and 152a-152c to the multiplexer 308, which in turn can interleave the segments 144a-144e and 152a-152c on a communication channel between the source processor 108 and the destination processor 102 via the switching fabric 110. When a first segment 144a of the packet 144 is received within the message manager 114, the input packet classification module 310 can look at the value in the context field 150 of the segment 144a and create/open a context 316 for the segment 144a. For example, when a first segment 144a arrives, the input packet classification module 310 can determine whether the value in the context field 150 of the segment 144a has previously been received. If the value in the context 150 has not previously been identified, the input packet classification module 310 can create/assign a new context 316 for the segment 144a. When a second segment 144b of the packet 144 is received in the message manager 114, the input packet classification module 310 can associate the second segment 144b with the context 316 based on the value of context field 150.

Similarly, when a first segment 152a of the second packet 152 arrives, the input packet classification module 310 can determine whether the value in the context field 150 of the segment 152a has previously been received. If the value in the context field 150 of the segment 152a has not previously been identified, the input packet classification module 310 creates/assigns a new context 318 for the segment 152a. When a second segment 152b of the packet 152 is received at the message manager 114, the input packet classification module 310 can associate the segment 152b with the context 318 based on the value in the context field 150. Therefore in this example, the input packet classification module 310 can create/assign two contexts 316 and 318 for the respective segments of packets 144 and 152.

As each of the segments of packet 144 are received in the destination processor 102, the message manager 114 can provide each segment 144a-144e to the first reassembly engine 312, which can reassemble each segment 144a-144e and can write the reassembled segment to a memory portion of the packet buffer 124 of FIG. 1. Similarly, as each of the segments 152a-152c are received in the destination processor 102, the message manager 114 can provide each segment 152a-152c of the packet 152 to the second reassembly engine 314, which can reassemble the segments 152a-152c and can write the reassembled segment to a memory portion of the packet buffer 124 of FIG. 1. After all of the segments 144a-144e and 152a-152c have been received, the input packet classification module 310 can close the context 316 or 318, and the message manager 114 can provide a descriptor, including a starting address of the packet in the packet buffer 124, to the queue manager 116 of FIG. 1 to be placed in a queue of the group of queues 120. Thus, the message manager 134 of the source processor 108 can control the order that contexts 316 and 318 for the packets 144 and 152 are closed and the descriptors for the packets 144 and 152 are placed in the queues 120 by controlling when the last segment for the packets 144 and 152 are transmitted to the destination processor 102. The descriptors for the packets 144 and 152 can be provided to a particular queue 120 based on classification rules utilized by the message manager 114 as discussed below.

In an embodiment, the header of each segment 144a-144e and 152a-152c can have a field indicating the position of the segment within the packet 144 or 152. For example, the header of segment 152a can include a field indicating that the segment 152a is the first segment of packet 152. Similarly, the header of segment 152b can include a field indicating that the segment 152b is a middle segment of packet 152. Also, the header of segment 152c can include a field indicating that the segment 152c is the last segment of packet 152. Thus, the message manager 114 can utilize the header of the segments 144a-144c and 152a-152c to determine when the last segment of each of the packets 144 and 152 is received.

After the last segment of the packets 144 and 152 are received in the message manager 114 of the destination processor 102 and the contexts 316 and 318 are closed, the message manager 114 can determine a particular queue for each of the packets 144 and 152 based on a classification of the packets 144 and 152. Therefore, the descriptor for packet 144 should be placed into a queue of the group of queues 120 before the descriptor for packet 152 based on the last segment of packet 144 being received at the destination processor 102 before the last segment of packet 152. Thus, the context field 150 and the synchronization of the segmentation engines 304 and 306 can maintain the packet order in the ordered data stream 130.

The selection of a particular downstream queue from the group of queues 120 for the packets 144 and 152 can be performed in substantially the same manner. Therefore, for simplicity the queue selection process will be discussed only with respect to packet 144. The message manager 114 includes multiple registers (not shown), wherein each register can be used to select a base queue group from the group of queues 120, out of all of available the groups, for the incoming packet 144. In an embodiment, different bits in the registers can be set to make an identification of different queues possible for the message manager 114. The different bits of the registers can be set during a start-up or initialization of the processor 102. For example, each of the registers can specify different bits and combinations of bits that are used for selecting the queue group (the base queue identifier) from the groups of queues 120. In another embodiment, the registers can be replaced with software or an algorithm that is executed to determine a queue for an incoming message.

The message manager 114 can mask the context field 150 and other bits in the header 146 of the packet 144 during the selection of a queue for the packet 144. Masked bits used herein are bits that are disregarded and not used during the identification of a queue for the message 132. The masking of bits in the fields of the header 134 enables a specific registers to be selected for a range of streams or messages, e.g., more than one stream or message, based on a particular number of the bits not being used for the queue identifier. Thus, the packets 144 and 152 may be placed in the same queue of the group of queues 120 even though the context fields 150 can vary between the packets 144 and 152 since the context fields 150 are masked during selection of a queue for the packets 144 and 152.

The message manager 114 can compare the unmasked bits to corresponding registers, and determine which corresponding register matches unmasked bits from the header 146. The corresponding register can then be used to select additional registers (not shown) used during the queue selection for the packet 144. The message manager 114 can select the register that matches with the resulting unmasked header bits as the classification rule for the packet 144.

For example, the message manager 114 selects a particular register when a combination of unmasked bits from the header 146 is '01101' and the particular register identifies '01101' as the bits for that register. In an embodiment, if message manager 114 does not identify a match between any of the registers and the unmasked bits, the message manager 114 can reject or drop the packet 144. However, in another embodiment, if message manager 114 does not identify a match between any of the registers and the unmasked bits, the message manager 114 can apply different factors to determine a closest match between unmasked bits and the classification rules. In this situation, the classification rule with the closest match will be selected as the classification rule for the packet 144.

The message manager 114 can then select a base queue identifier for the packet 144 based on the selected register. The base queue identifier can be a value that identifies a base group of queues 120 for the packet 144. The message manager 114 then determines a number of bits in each of the fields of the header 146 and in the payload 148 to be masked during the identification of a queue for the packet 144. Masked bits used herein are bits that are disregarded and not used during the selection/identification of a particular queue in a group of queues 120 for the packet 144.

The message manager 114 then identifies the number of bits to retrieve from the header 146 and the payload 148 based on the registers associated with the selected register. The message manager 114 selects the particular bits from the header 146 and the payload 148. The message manager 114 then assembles the particular bits from the header 146 and the payload 148 into a queue offset. The message manager 114 then combines the queue offset with the base queue identifier associated with the selected register to create the queue identifier for the packet 144. The message manager 114 then provides the queue identifier along with the packet 144 to the queue manager 116, which in turn places the descriptor for the packet 144 into the queue in the base group of queues 120 associated with the queue identifier.

Figure 4:
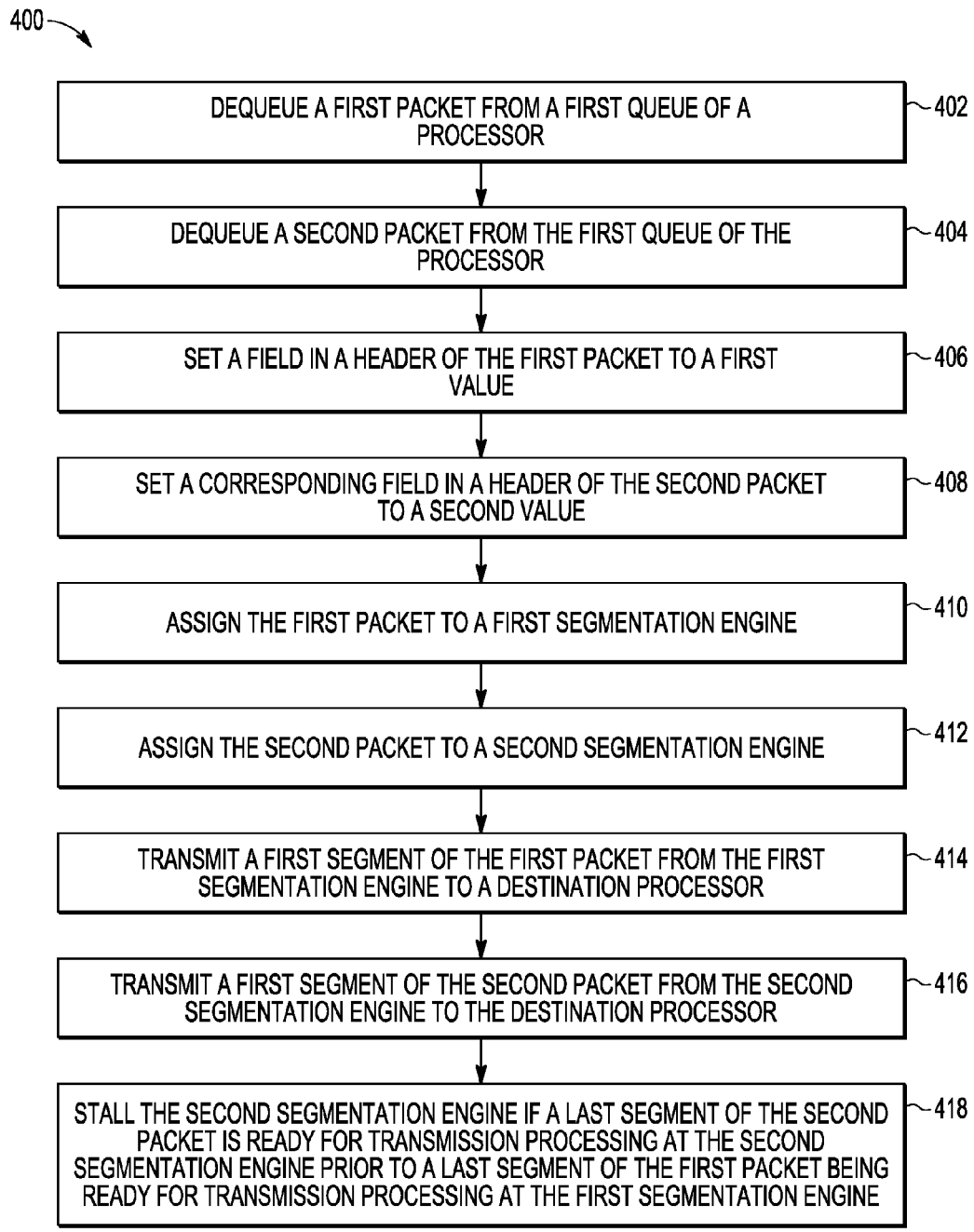
FIG. 4 illustrates a method for maintaining packet order in an ordered data stream between two processors of FIG. 1 in accordance with at least one embodiment of the present disclosure.

FIG. 4 illustrates a method for maintaining packet order in an order data stream between the processors of FIG. 1 in accordance with at least one embodiment of the present disclosure. At block 402, the message manager 134 of the source processor 108 dequeues a first packet from a first queue of the source processor 108. At block 404, the message manager 134 dequeues a second packet from the first queue of the source processor 108. In one embodiment, the header of the first packet can be identical to the header of the second packet when the packets are dequeued. The message manager 134 sets a value of a field in a header of the first packet to a first value at block 406. At block 408, the message manager 134 sets a value of a corresponding field in a header of the second packet to a second value. In an embodiment, the first value in the field of the first packet and the second value of the corresponding field in the second value can create a forced ordering between the first packet and the second packet. In one embodiment, the queue selection process for all of the packets in the ordered data stream cause the destination processor 102 to direct the first packet and the second packet to the same queue. In one embodiment, the field of the first packet and the corresponding field of the second packet are identified as the context field for the packets by the source processor 108 and the destination processor 102.

At block 410, the message manager 134 assigns the first packet to a first segmentation engine 304. At block 412, the message manager 134 assigns the second packet to a second segmentation engine 306. The segmentation engines can divide the payloads of the packets into smaller chunks or segments for transmission and can include the header from a packet as the header for each segment associated with that packet. In one embodiment, the header of a segment of the first packet can be identical to the header of a segment of the second packet except for the context field of the segment headers. The message manager 134 transmits a first segment of the first packet to the destination processor 102 at block 414. At block 416, the message manager 134 transmits a first segment of the second packet to the destination processor 102. At block 418, the message manager 134 stalls the second segmentation engine if a last segment of the second packet is ready for transmission processing at the second segmentation engine 306 prior to a last segment of the first packet being ready for transmission processing at the first segmentation engine 304.

Figure 5:
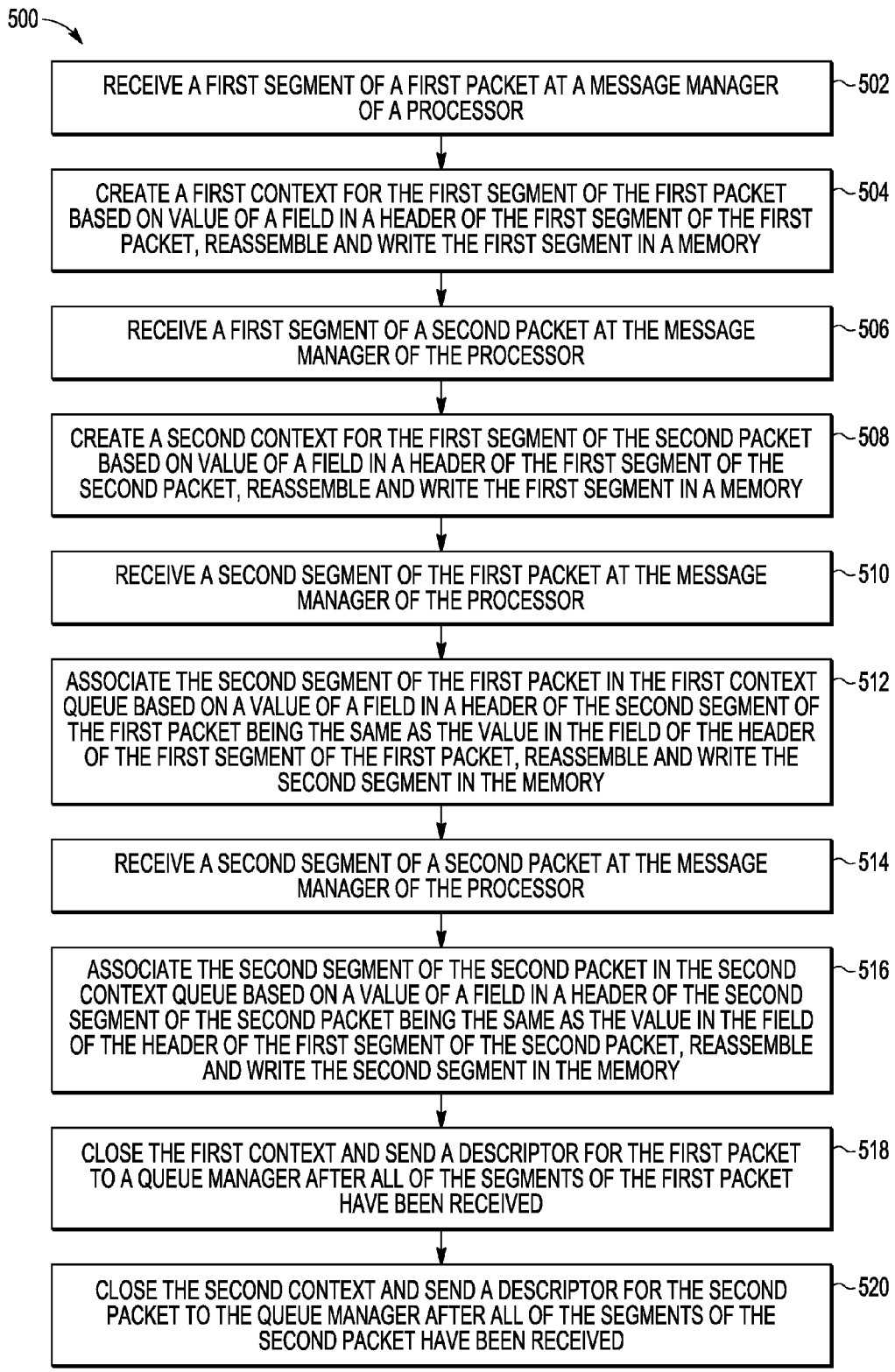
FIG. 5 illustrates a method for placing packet of an ordered data stream in a queue of a processor of FIG. 1 in accordance with at least one embodiment of the present disclosure.

FIG. 5 illustrates another method for maintaining packet order in an order data stream between the processors of FIG. 1 in accordance with at least one embodiment of the present disclosure. At block 502, the message manager 114 of the destination processor 102 receives a first segment of a first packet from the source processor 108. The first packet can be a packet within an ordered data stream between the source processor 108 and the destination processor 102. At block 504, the message manager 114 creates a first context for the first segment of the first packet based on a value in a header of the first segment of the first packet, reassembles the first segment, and writes the reassembled first segment in a memory. In an embodiment, the field can be a particular field previously identified by the source processor 108 and the destination processor 102 as a context field for packets in the ordered data stream. The context field can be any field of the header that is used by the source processor 108 and the destination processor 102 to identify that the segment is part of a particular packet.

At block 506, the message manager 114 receives a first segment of a second packet. At block 508, the message manager 114 creates a second context for the first segment of the second packet based on a value of a field in a header of the first segment of the second packet, reassembles the first segment of the second packet, and writes the reassembled first segment of the second packet in the memory. In an embodiment, the value of the header of the first segment of the first packet is different than the value of the field in the header of the first segment of the second packet. In one embodiment, the field of the header of the first segment of the second packet corresponds to the field of the header of the first segment of the first packet, such that the fields of both headers are the context fields of the headers. The message manager 114 receives a second segment of the first packet at block 510. At block 512, the message manager 114 associates the second segment of the first packet with the first context, reassembles the second segment of the first packet, and writes the reassembled second segment of the first packet as part of the first packet in the memory. In an embodiment, the second segment of the first packet is associated with the first context in response to a value of a field in a header of the second segment of the first packet being the same as the value of the field in the header of the first segment of the first packet.

At block 514, the message manager 114 receives a second segment of the second packet. The message manager 114 associates the second segment of the second packet into the second context, reassembles the second segment of the second packet, and writes the reassembled second segment of the second packet as part of the second packet in the memory. In an embodiment, the second segment of the second packet is associated with the second context in response to a value of a field in a header of the second segment of the second packet being the same as the value of the field in the header of the first segment of the second packet at block 516. At block 518, the message manager 114 closes the first context and provides a descriptor for the first packet to a queue manager after all of the segments of the first packet have been received.

At block 520, the message manager 114 closes the first context and provides a descriptor for the second packet to the queue manager after all of the segments of the second packet have been received. In one embodiment, the descriptor for the first packet is sent to the queue manager before the descriptor for the second packet is sent to the queue manager based on all of the segments of the first packet being received in the message manager 114 prior to all of the segments of the second packet. Thus, the first packet and second packet are queued in a destination device in the same order as they are dequeued in a source device.

The previous description in combination with the Figures is provided to assist in understanding the teachings disclosed herein. The previous discussion focused on specific implementations and embodiments of the disclosure. This focus was provided to assist in describing the disclosure and should not be interpreted as a limitation on the scope or applicability of the disclosed.

In accordance with one aspect of the present disclose, a method of maintaining packet order in an ordered data stream in a processor is provided. In one embodiment, the method includes dequeuing a first packet from a first queue of the processor. The method further includes dequeuing a second packet from the first queue of the processor. In this case, the second packet is subsequent to the first packet in an ordered data stream. The method also includes transmitting segments of the first packet and segments of the second packet to a destination processor. The method further includes determining whether a last segment of the first packet has been transmitted to the destination processor when a last segment of the second packet is ready for transmission. The method also includes stalling the transmission of the last segment of the second packet in response to the last segment of the second packet being ready for transmission prior to transmission of the last segment of the first packet, the stalling to prevent the last segment of the second packet from being transmitted prior to the last segment of the first packet.

In one embodiment, the method further includes setting a value of a context field in a header of the second packet to a different value than a value of a context field in a header of the first packet to distinguish between the first packet and the second packet in the destination processor. In one embodiment, the method also includes at the destination processor, providing the first packet to a first queue of the destination processor in response to receiving all segments of the first packet, and providing the second packet to the first queue of the destination processor in response to receiving all segments of the second packet. In one embodiment, information of a header of the first packet being dequeued is the same information as a header of the second packet being dequeued.

In one embodiment, the method further includes transmitting a first segment of the first packet from a first segmentation engine of the processor to the destination processor. The method also includes transmitting a first segment of the second packet from a second segmentation engine of the processor to the destination processor. In this case, the header information of the first segment of the first packet, and header information of the first segment of the second packet are substantially identical, except for a value of a context field in the headers. In this case, the last segment of the second packet is received at the destination processor after the last segment of the first packet in response to stalling the second segmentation engine. In one embodiment, an order of the first packet and the second packet is maintained in the ordered data stream in response to the last segment of the second packet being processed in a second segmentation engine subsequent to the last segment of the first packet being processed by a first segmentation engine.

In accordance with another aspect of the present disclosure, a method of placing ordered packets in a queue of a processor includes receiving a first segment of a first packet at a message manager of the processor. The method further includes assigning a first context to segments of the first packet, including the first segment, based on a value of a field in a header of the first segment of the first packet. The method also includes receiving a first segment of a second packet at the message manager of the processor, the first packet and the second packet being packets of a common data stream. The method further includes assigning a second context to segments of the second packet based on a value of a field in a header of the first segment of the second packet. In this case, the value of the field in the header of the first segment of the second packet is different than the value of the field in the header of the first segment of the first packet. Also in this case, a last segment of the second packet is received at the message manager after a last segment of the first packet in response to a source processor stalling a second segmentation engine associated with the second packet until the last segment of the first packet is transmitted from the source processor.

In one embodiment, the method further includes receiving a second segment of the first packet at the message manager. The method also includes associating the second segment of the first packet in the first context in response to a value of the field in a header of second segment of the first packet being the same as the value of the field in the header of first segment of the first packet. The method further includes receiving a second segment of the second packet at the message manager. The method also includes associating the second segment of the second packet in the second context in response to a value of the field in a header of second segment of the second packet being the same as the value of the field in the header of the first segment of the second packet.

In one embodiment, the method further includes reassembling each segment of the first packet in response to each segment of the first packet being received at the message manager. The method also includes placing each segment of the first packet in a memory buffer after reassembly. The method further includes reassembling each segment of the second packet in response to each segment of the second packet being received at the message manager. The method also includes placing each segment of the second packet in the memory after reassembly. In this case, an order of the first packet and the second packet is maintained in an ordered data stream in response to stalling the second segmentation engine if the last segment of the second packet is received in the second segmentation engine prior to the last segment of the first packet being processed by the first segmentation engine.

In accordance with another aspect of the present disclosure, a data processor device is provided. The data processor includes a segmentation engine, the segmentation engine to receive packets to be transmitted from the data processor device, the segmentation engine segments a payload of each of the packets to be transmitted into a plurality of segments for transmission to a destination data processor device. In this case, the segmentation engine determines if a last segment of a prior packet for transmission in an ordered data stream from the data processor has been transmitted when a last segment of a subsequent packet is ready for transmission, and to stall if the last segment of the subsequent packet is ready to be processed in the segmentation engine prior to the last segment of the prior packet being transmitted.

In one embodiment the data processor device further includes a context rotation module, the context rotation module to indicate a value of a field in a header of the packets. In this case, the value of the field in the header of the packets are different to distinguish between packets at the destination data processor device. In one embodiment, the context rotation engine selects a field in the header of the packets to be modified based on a queue selection process implemented at the destination data processor device. In this case, the queue selection process causes the destination data processor device to queue the packets in the same queue.

In one embodiment, information in the header of the header of the packets being dequeued is the same. In one embodiment, the context field is masked for the packets in the destination data processor device when determining a target queue where the packets are to be queued. In one embodiment, an order of the packets is maintained in the ordered data stream in response to the segmentation engine being stalled if the last segment of the subsequent packet is ready to be processed in the segmentation engine prior to the last segment of the prior packet being transmitted. In one embodiment, the data processor device further includes a plurality of segmentation engines, the plurality of segmentation engines concurrently segment different packets in the data stream. In this case one of the plurality of segmentation engines stalls the other segmentation engines until a last segment of a packet in the one segmentation engine is transmitted to the destination processor, wherein packets in the other segmentation engines are subsequent packets in the data stream to the packet in the one segmentation engine.

Based upon the description herein, it will be appreciated that the preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method of maintaining packet order in an ordered data stream in a processor, the method comprising:
dequeuing a first packet from a first queue of the processor;
dequeuing a second packet from the first queue of the processor, wherein the second packet is subsequent to the first packet in an ordered data stream;
transmitting segments of the first packet and segments of the second packet to a destination processor, wherein at least one of the segments of the second packet is transmitted during the transmission of the segments of the first packet;
determining whether a last segment of the first packet has been transmitted to the destination processor when a last segment of the second packet is ready for transmission; and
stalling the transmission of the last segment of the second packet in response to the last segment of the second packet being ready for transmission prior to transmission of the last segment of the first packet, the stalling to prevent the last segment of the second packet from being transmitted prior to the last segment of the first packet.

2. The method of claim 1, further comprising:
setting a value of a context field in a header of the second packet to a different value than a value of a context field in a header of the first packet to distinguish between the first packet and the second packet in the destination processor.

3. The method of claim 2, further comprising:
at the destination processor, providing the first packet to a first queue of the destination processor in response to receiving all segments of the first packet, and providing the second packet to the first queue of the destination processor in response to receiving all segments of the second packet.

4. The method of claim 1, wherein information of a header of the first packet being dequeued is the same information as a header of the second packet being dequeued.

5. The method of claim 1, further comprising:
transmitting a first segment of the first packet from a first segmentation engine of the processor to the destination processor; and
transmitting a first segment of the second packet from a second segmentation engine of the processor to the destination processor, wherein header information of the first segment of the first packet, and header information of the first segment of the second packet are substantially identical, except for a value of a context field in the headers.

6. The method of claim 5, wherein the last segment of the second packet is received at the destination processor after the last segment of the first packet in response to stalling the second segmentation engine.

7. The method of claim 1, wherein an order of the first packet and the second packet is maintained in the ordered data stream in response to the last segment of the second packet being processed in a second segmentation engine subsequent to the last segment of the first packet being processed by a first segmentation engine.

8. A method of placing ordered packets in a queue of a processor, the method comprising:
receiving a first segment of a first packet at a message manager of the processor;
assigning a first context to segments of the first packet, including the first segment, based on a value of a field in a header of the first segment of the first packet;
receiving a first segment of a second packet at the message manager of the processor, the first packet and the second packet being packets of a common data stream; and
assigning a second context to segments of the second packet based on a value of a field in a header of the first segment of the second packet, wherein the value of the field in the header of the first segment of the second packet is different than the value of the field in the header of the first segment of the first packet, wherein a last segment of the second packet is received at the message manager after a last segment of the first packet in response to a source processor stalling a second segmentation engine associated with the second packet until the last segment of the first packet is transmitted from the source processor.

9. The method of claim 8 further comprising:
receiving a second segment of the first packet at the message manager;
associating the second segment of the first packet in the first context in response to a value of the field in a header of second segment of the first packet being the same as the value of the field in the header of first segment of the first packet;
receiving a second segment of the second packet at the message manager; and
associating the second segment of the second packet in the second context in response to a value of the field in a header of second segment of the second packet being the same as the value of the field in the header of the first segment of the second packet.

10. The method of claim 9 further comprising:
reassembling each segment of the first packet in response to each segment of the first packet being received at the message manager;
placing each segment of the first packet in a memory buffer after reassembly;
reassembling each segment of the second packet in response to each segment of the second packet being received at the message manager; and
placing each segment of the second packet in the memory after reassembly.

11. The method of claim 10, wherein an order of the first packet and the second packet is maintained in an ordered data stream in response to stalling the second segmentation engine if the last segment of the second packet is received in the second segmentation engine prior to the last segment of the first packet being processed by the first segmentation engine.

12. A data processor device comprising:
a segmentation engine, the segmentation engine to receive packets to be transmitted from the data processor device, the segmentation engine segments a payload of each the packets to be transmitted into a plurality of segments for transmission to a destination data processor device, transmits segments of multiple packets, the segmentation engine determines if a last segment of a prior packet for transmission in an ordered data stream from the data processor has been transmitted when a last segment of a subsequent packet is ready for transmission, and stalls if the last segment of the subsequent packet is ready to be processed in the segmentation engine prior to the last segment of the prior packet being transmitted.

13. The data processor device of claim 12, further comprising:
a context rotation module, the context rotation module to indicate a value of a field in a header of the packets, wherein the value of the field in the header of the packets are different to distinguish between packets at the destination data processor device.

14. The data processor device of claim 13, wherein the context rotation engine selects a field in the header of the packets to be modified based on a queue selection process implemented at the destination data processor device.

15. The data processor device of claim 14, wherein the queue selection process causes the destination data processor device to queue the packets in the same queue.

16. The data processor device of claim 12, wherein information in the header of the header of the packets being dequeued is the same.

17. The data processor device of claim 16, wherein the context field is masked for the packets in the destination data processor device when determining a target queue where the packets are to be queued.

18. The data processor device of claim 12, wherein an order of the packets is maintained in the ordered data stream in response to the segmentation engine being stalled if the last segment of the subsequent packet is ready to be processed in the segmentation engine prior to the last segment of the prior packet being transmitted.

19. The data processor device of claim 12, further comprising:
a plurality of segmentation engines, the plurality of segmentation engines concurrently segment different packets in the data stream.

20. The data processor device of claim 19, wherein one of the plurality of segmentation engines stalls the other segmentation engines until a last segment of a packet in the one segmentation engine is transmitted to the destination processor, wherein packets in the other segmentation engines are subsequent packets in the data stream to the packet in the one segmentation engine.

* * * * *